July 31, 1956 H. E. ALTGELT 2,756,660
RELEASABLE PLOW STANDARD
Filed Sept. 2, 1950 2 Sheets-Sheet 1
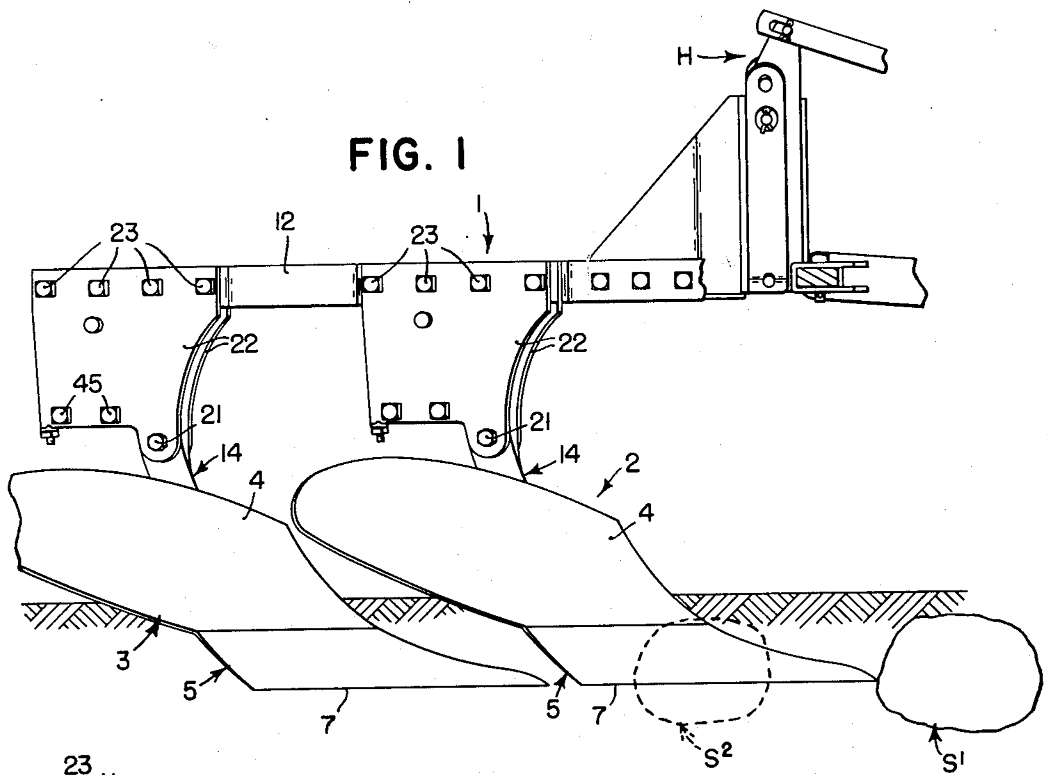
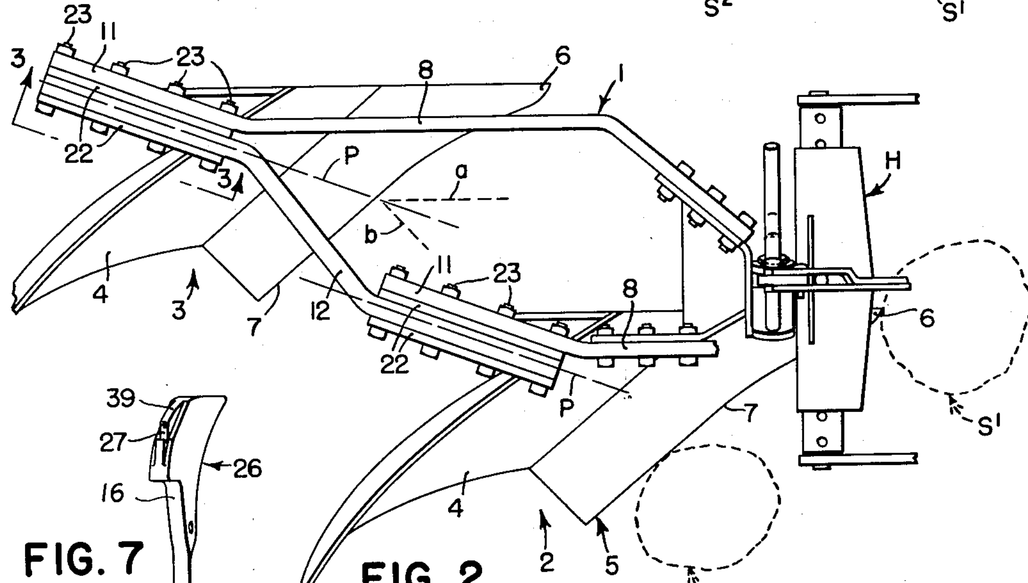
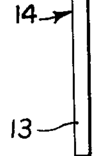
INVENTOR.
HERMAN E. ALTGELT
BY C. Parker & R. C. Johnson
ATTORNEYS July 31, 1956 H. E. ALTGELT 2,756,660
RELEASABLE PLOW STANDARD
Filed Sept. 2, 1950 2 Sheets-Sheet 2
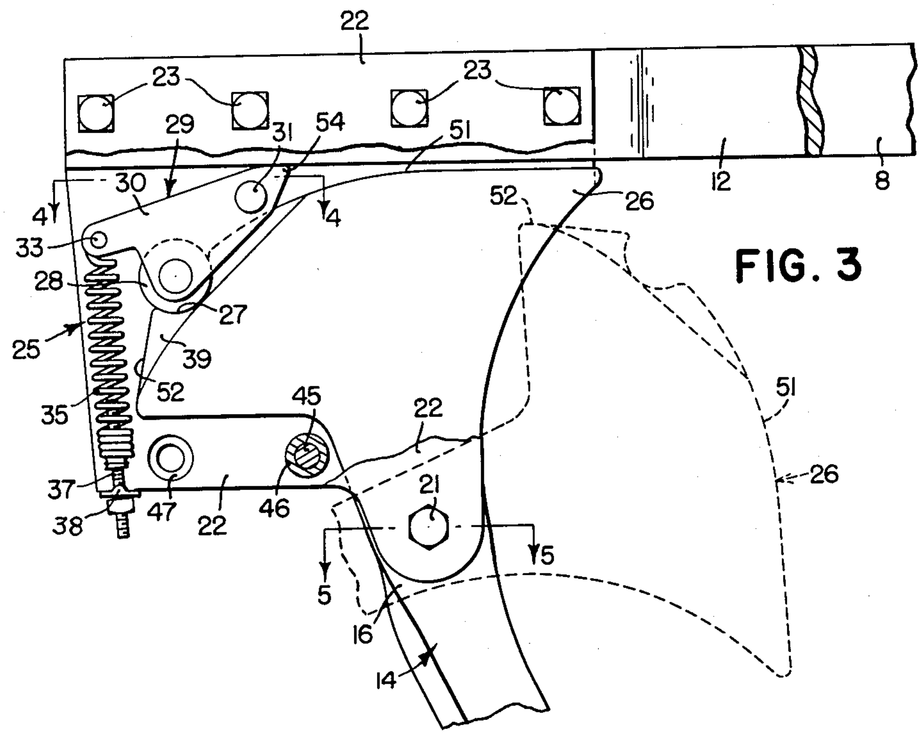
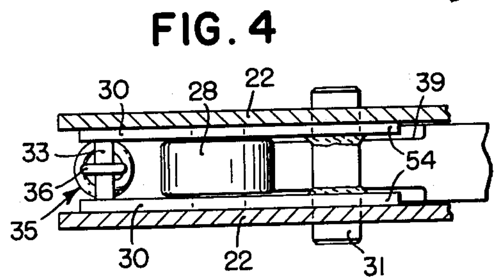
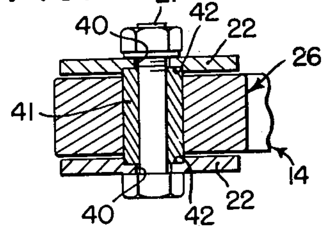
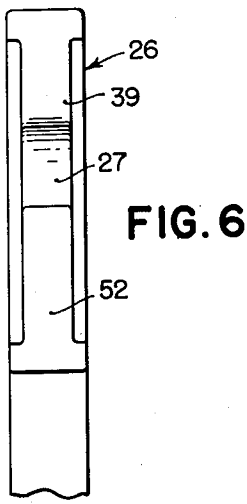
FIG. 6
*INVENTOR.*
HERMAN E. ALTGELT
BY
ATTORNEYS United States Patent Office 2,756,660

Patented July 31, 1956

2,756,660

RELEASABLE PLOW STANDARD

Herman E. Altgelt, Moline, Ill., assignor to Deere & Company, Moline, Ill., a corporation of Illinois Application September 2, 1950, Serial No. 183,016

4 Claims. (Cl. 97—47.89)

The present invention relates generally to agricultural implements and more particularly to ground-working implements having tool means operating below the surface of the ground, such as plows, which may be damaged by continued forward travel of the outfit after one of the tool units encounters an obstruction, such as a large stone, stump or root, or the like.

The object and general nature of the present invention is the provision of an agricultural machine having overload release means so constructed and arranged that the overload responsive means will automatically release, irrespective of whether or not the tool strikes an obstruction head-on or at one side. More particularly, it is a feature of this invention to provide overload release means particularly adapted for plows, in which the overload release means is constructed and arranged to have a plane of operation which extends at an angle to the line of advance, whereby a plow bottom is automatically released, even though the obstruction encountered comes into contact with a rearwardly and forwardly angled share, rather than meeting the plow point directly in the line of advance of the latter. More specifically, it is a feature of this invention to provide a pivotal connection between the plow bottom and its associated plow beam, so constructed and arranged that, acting in conjunction with a spring trip device or the like, the plow bottom is movable relative to the plow beam in a direction that extends at an angle to the line of advance, the angle being such that the plane of movement of the plow bottom extends rearwardly and landwardly, whereby the spring trip is freely operable to protect the plow bottom, irrespective of whether the obstruction encountered lies directly ahead of the plow point or engages the rearwardly and furrowwardly angled forward edge of the plowshare.

These and other objects and advantages of the present invention will be apparent to those skilled in the art after a consideration of the following detailed description of the preferred embodiment of this invention, taken in conjunction with the accompanying drawings, in which:

Figures 1 and 2 are side and plan views, respectively, of a two-bottom, tractor-mounted plow in which the principles of the present invention have been incorporated.

Figure 3 is an enlarged fragmentary detail view showing the overload responsive spring trip device, Figure 3 corresponding generally to a view taken along the line 3—3 of Figure 2, with such parts broken away.

Figure 4 is a sectional view taken along the line 4—4 of Figure 3.

Figure 5 is a sectional view taken along the line 5—5 of Figure 3.

Figure 6 is a rear view, looking forwardly, of the cam section at the upper end of a standard which connects each plow bottom to the associated beams of the plow frame.

Figure 7 is a detail view of one of the standards.

The present invention is incorporated in a two-bottom plow of the tractor-carried type, in which the tractor carries suitable hitch means H for receiving a plow frame 1 to which the plow bottoms 2 and 3 are rigidly connected. The plow bottoms 2 and 3 are of the moldboard type and are identical, for all practical purposes, each including a moldboard 4 and a plowshare 5 having a forwardly extending plow point 6 and a generally rearwardly and forwardly extending cutting edge 7. Each plow bottom is mounted on a generally fore-and-aft extending plow beam 8 which, as best shown in Figure 1, forms a part of the frame 1. Each tool beam 8 at its rear end is bent so as to extend rearwardly and landwardly, as indicated at 11, for a purpose which will appar later, and a rear brace 12 connects the rear ends of the beams 8 and forms a rigid part of the frame.

Each of the plow bottoms 2 and 3 is fixed, as by a plurality of bolts or the like, to the lower end of a generally vertically extending plow standard 14. As best shown in Figure 7, the lower end, which is indicated at 13, of each plow standard 14 lies in a generally fore-and-aft extending vertical plane but the upper end, indicated at 16, is bent or twisted so that it lies at the same angle, relative to a vertical fore-and-aft extending plane, as the rear bent portion 11 of the associated plow beam 8. Each plow standard 14 is pivotally connected to the rear bent end 11 of the associated plow beam 8 by means of a pivot member 21 carried by the lower portions of a pair of vertically disposed bracket plates 22, the upper portions of which are rigidly secured, as by bolts 23, to the rear portion 11 of the associated plow beam. The brackets 22 are preferably in the form of flat plates and the pivot bolt 21 lies perpendicular thereto, which constrains the associated plow standard 14 for pivotal movement relative to the plow beam in a plane P that extends rearwardly and landwardly, as shown in Figure 2, at an angle to the line of advance, the direction of which is generally the same as the fore-and-aft extending portion of the associated portion plow beam 8.

Overload release mechanism of the spring trip type is connected between each plow bottom standard 14 and the associated plow beam 8 so as to hold the associated plow bottom in normal operating position at all times, except when excessive loads are encountered, as when the plow bottom strikes an obstruction. While any suitable overload release mechanism may be employed in the broader applications of the present invention, the form shown in the drawings is preferred. Each release mechanism is indicated in its entirety by the reference numeral 25 and comprises a cam section 26 formed on the upper portion 16 of the plow bottom standard 14. The rearward portion of each cam section 26 is formed with an upwardly facing notch 27 in which a roller 28, carried on an arm 29, is journaled. The arm or lever 29 is made up of two plates 30 welded or otherwise fixed to a pin or stud 31 by which the arm 29 is pivotally connected at its front end to the plates 22. At its rear end, the arm 29 carries a pin 33 to which the upper end of a relatively heavy tension spring 35 is connected, as at 36. The lower end of the spring 35 is threaded onto the upper end of an adjusting screw-threaded rod member 37 which is slidably connected at its lower end with a trunnion member 38 that is rockably received in notches formed in the lower rear portions of the two bracket plates 22. It will be seen, particularly from Figures 3, 4 and 6, that the notch 27 is formed in a narrowed portion 39 of the cam member 26, which narrowed portion is dimensioned to fit in between the two lever plates 30. Otherwise, the cam member 26 occupies substantially all of the space between the bracket plates 22.

As best shown in Figure 5, the pivot 21 by which the plow standard 14 is pivotally connected with the bracket structure 22, 22 extends through apertures 40 in the plates 22 and through a pivot bushing 41 which seats in sockets 42, which are concentric with respect to the bolt-receiving apertures 40 just mentioned. The bushing 41 is dimensioned so as to rigidly connect the two plates 22, when the bolt 21 is tightened, with sufficient clearance between the cam section 26 and the bracket plates 22 to accommodate relatively free movement of the plow standard 14 about the bolt 21 and bushing 41 as a pivot. A pair of bolt means 45 is used to connect the lower rear portions of the plates 22, whereby when the bolts 45 are tightened the bracket plates 22 are rigidly connected together. The bushing of the bolt means 45 is indicated by the reference numeral 46, and in the left-hand portion of Figure 3, the bushing 46 and associated parts are omitted in order to show the socket 47 which is formed in each plate 22 to receive the associated bushing 46.

The spring 35 is of sufficient strength to hold the roller 28 seated in the notch 27 in the cam section 26 under all normal loads, but if the plow bottom is subjected to an abnormal loading, as by striking a stone or the like, the roller 28 is forced out of the notch 27, whereupon the plow bottom standard 14 swings about the pivot 21 in the generally vertical plane P to permit the plow bottom to swing over and clear the obstruction. During this action, the roller 28 rides down along the rear side 52 of the cam section, effectively holding the plow bottom in its tripped position until backing the outfit serves to restore the plow bottom to its normal position. The arm plates 30 have forward extensions 54 which, as shown in Figure 3, are arranged to contact the adjacent portion on the associated plow frame member 12 so as to serve as a stop limiting the downward swinging of the arm 29 in the tripped position of the plow standard 14, shown in dotted lines in Figure 3. This prevents the roller 28 from getting hooked behind the cam member 26 which, if permitted to occur, might prevent the restoration of the plow bottom to its operating or plowing position.

While any suitable overload trip device may be employed, the present invention is not especially concerned with the particular details of the overload release means 25. It is an essential feature of the present invention, however, to so arrange the parts that in responding to an overload, the plow bottom will swing rearwardly about an axis that is not perpendicular to the line of advance, or to the generally fore-and-aft extending plow beam, but about an axis which is disposed at such an angle that the plane of movement of the plow bottom, represented by the line P in Figure 2, extends forwardly and furrowwardly so that it lies generally midway between a fore-and-aft extending direction, as represented by the line *a* in Figure 2, and a line *b* that is perpendicular to the cutting edge 7 of the plowshare. Expressed in another way, the axis of pivoting of each overload release controlled plow beam is, according to the present invention, arranged to extend in a line that lies generally midway between a line perpendicular to the line of advance, and the line of the cutting edge 7 of the plowshare.

The particular advantage of this arrangement is that the overload release unit 25 is positioned so as to respond practically instantaneously to an overload condition, whether the overload be caused by encountering an obstruction, such as a heavy stone or the like, immediately in front of the plow point, as represented by the imbedded stone $S^1$, or by encountering an obstruction, such as a stone $S^2$ somewhere along the rearwardly and furrowwardly angled cutting edge of the plowshare 5. Due to the work of the latter, the plowshare encounters obstructions and the like along its cutting edge many times more often than an obstruction is encountered directly ahead of the plow point 6. Therefore, in arranging the plane P of action of the pivotal support of the plow bottom somewhere generally midway between the fore-and-aft extending line and a line perpendicular to the plowshare edge 7, the overload trip mechanism is arranged to respond to practically any condition arising from the plow striking an obstruction.

It will be noted that each of the plow bottoms 2 and 3 is connected to the associated plow beam by means of overload trip mechanism arranged as described above. Generally speaking, the problem of encountering obstructions is much more serious in a multi-bottom plow, than in the single-bottom plow. In the latter case, if the plow bottom strikes a stone or the like somewhere along the forward edge of the furrow, generally at one side of the plow point, the entire plow can more or less readily shift laterally to pass around the obstruction. However, in the case of heavier plows employing two or more bottoms, it is generally more likely that the plow bottom connections will be sprung before the entire plow will shift to one side to permit the plow bottom to pass the obstruction.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a plow, a plow frame including a beam, a pair of brackets rigidly connected at their upper portions to said beam and extending downwardly therefrom in laterally spaced apart relation, a plow standard pivotally connected with the lower portions of said brackets and at its upper end having a fore-and-aft extending section disposed between said brackets adjacent their points of connection with said beam and substantially underneath and closely adjacent the lower edge of said beam forward of the rearward end thereof, the thickness of said section being substantially equal to the distance between the laterally inner faces of said brackets, whereby twisting forces are transmitted substantially directly to the plow beam by the upper portions of said brackets, and means disposed between said brackets and engageable with the rear portion of said extended plow standard section for normally holding said plow standard in operating position.

2. The invention set forth in claim 1, further characterized by said last mentioned means including a notch in the upper rear portion of said extending plow standard section, a member carrying a roller disposable in said notch and pivotally mounted between said brackets, and spring means disposed generally in rear of said extended plow section and between said brackets and connected at its upper end with said member for applying a standard-retaining bias thereto.

3. The invention set forth in claim 2, further characterized by said spring-biased member comprising a pair of laterally spaced arm members, said roller being disposed between said members, and the upper portion of said plow standard being reduced in lateral thickness at said notch so as to receive said arm members when said roller is in engagement in said notch.

4. The invention set forth in claim 2, further characterized by said spring-biased member having an extension engageable with said plow beam for limiting the movement of said member about its pivotal connection with said brackets in one direction.

References Cited in the file of this patent

UNITED STATES PATENTS

| | | |
|---|---|---|
| 323,004 | Wheeler | July 28, 1885 |
| 737,167 | Smith | Aug. 25, 1903 |
| 1,078,871 | Olson | Nov. 18, 1913 |
| 1,088,121 | Bigham | Feb. 24, 1914 |
| 1,808,477 | Printz | June 2, 1931 |
| 1,830,013 | Bohmker | Nov. 3, 1931 |
| 2,048,256 | Geyer | July 21, 1936 |
| 2,383,022 | Stranlund | Aug. 21, 1945 |
| 2,467,548 | Bradley | Apr. 19, 1949 |
| 2,552,292 | Metz et al. | May 8, 1951 |

FOREIGN PATENTS

| | | |
|---|---|---|
| 441,958 | Germany | Mar. 17, 1927 |
| 114,427 | Sweden | May 3, 1945 |